Patented June 13, 1944

2,351,409

UNITED STATES PATENT OFFICE 2,351,409

ARYLAMINOKETO COMPOUND AND PREPARATION

Joseph B. Dickey and James G. McNally, Rochester, N. Y., assignors to Eastman Kodak Company, Rochester, N. Y., a corporation of New Jersey No Drawing. Application September 3, 1941,
Serial No. 409,380

7 Claims. (Cl. 260—577)

This invention relates to amino compounds containing a substituent having a keto group therein, said substituent being attached to the N of an amino group. More particularly, this invention relates to arylamino compounds containing an N-$\beta'$-hydroxy-$\gamma$-ketoalkyl group in the molecule, as will be described in detail.

This application is a continuation-in-part of our U. S. application Serial No. 301,466, filed October 26, 1939, and is also related in some respects to our applications Serial Nos. 365,108, filed November 9, 1940 (now U. S. Patent 2,323,314, dated July 6, 1943) and 360,626, filed October 10, 1940, (now U. S. Patent 2,336,275, dated December 7, 1943). In our application 301,466 we have described in particular compounds useful in photography, as for example, color photographic developers. The compounds we describe herein are ones useful in particular as dye intermediates, although certain of the compounds, as will be indicated, may be employed for photographic purposes, as for example, black-and-white developers, antioxidants, and various other purposes. It is, therefore, apparent that the development of new compounds which may be employed in a number of ways industrially is a highly desirable result.

This invention has for one object to provide new arylamino compounds having a carbon chain-carbonyl linkage attached to the nitrogen atom of the compound. Still another object is to produce new arylamino compounds of the class indicated, which are useful for dye intermediates and certain other industrial purposes. A still further object is to produce new compounds of the class indicated wherein the aryl nucleus may contain one or more substituents. A still further object is to provide novel methods for preparing the aforesaid compounds from various materials. Other objects will appear hereinafter.

We have found that novel amino compounds of the present invention wherein a certain keto-containing linkage has been introduced in the molecule, imparts to the compound special desirable properties, as for example, properties rendering the compounds particularly useful as dye intermediates in the preparation of dyes for cellulose acetate fabrics, or compounds for use for certain photographic purposes. Also, certain of our compounds, due to their solubility characteristics and other properties, do not exhibit certain of the undesirable allergenic properties exhibited by prior art compounds.

Generically our new compounds comprise an arylamino nucleus wherein at least one of the atoms attached to the nitrogen atom has been substituted by a grouping containing the structure carbon chain-carbonyl-R', where R' has a value which will be discussed hereinafter. The molecule may be substituted in various other respects, as will be discussed, such as for example another atom attached to the nitrogen may be substituted or replaced by various components and, also, the aryl nucleus may have attached thereto various groups, all of which will be described more fully hereinafter.

Generic formulations illustrating the generic nature of certain of our compounds would be as follows:

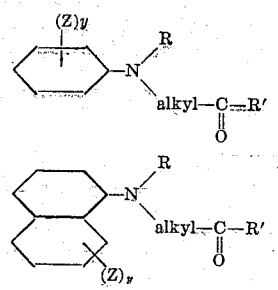

In these formulations we have illustrated the most usual example of our compounds wherein the aryl nucleus is comprised of benzene or naphthalene, which components may be substituted or unsubstituted as exemplified by Z. In many instances, as will be described, we would, for example, employ a compound wherein the aryl nucleus was substituted, as for example, with a lower alkyl group, more specifically exemplified by toluidine.

Our novel compounds of the present invention may be produced by methods comparable to the several methods described in our companion application Serial No. 301,466, above identified. One of these methods may be generically illustrated as follows:

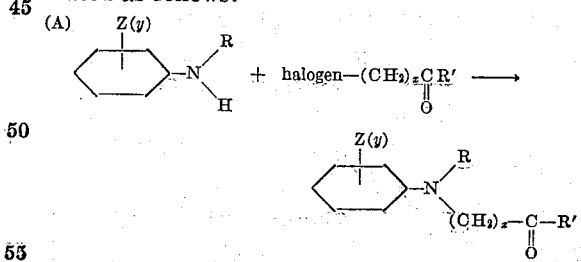

Another method which might be employed is generically illustrated as follows:

(B) 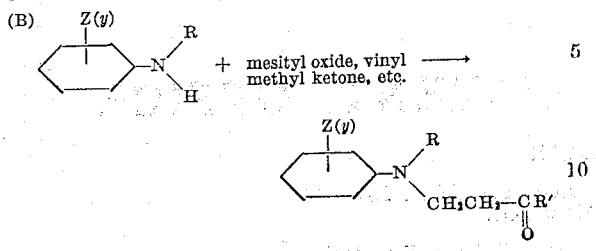

In the foregoing formulas R represents a member from the group consisting of alkyl, hydroxy alkyl, alkoxyalkyl, and aryl, Z represents a member from the group consisting of alkyl, alkoxy, hydrogen, halogen, hydroxy, amino, and thio-alkyl, and $y$ is an integer not greater than 5. R' is usually alkyl.

The keto compounds with which the present invention is particularly concerned are quite useful in the production of dye intermediates for producing azo and other type dyes useful in dyeing cellulose acetate fabrics. While this is one of the purposes for which the compounds of our invention are useful, it will be observed that, for example, compounds resulting when Z is a hydroxy or amino groups in the ortho or para position are useful for photographic purposes such as for black-and-white photographic developers.

While the foregoing represents certain of the generic aspects of our invention, from the numerous compounds thereunder which we have prepared and tested, there are certain groups which exhibit special properties and which we may prefer for various reasons. Among these compounds may be listed the following:

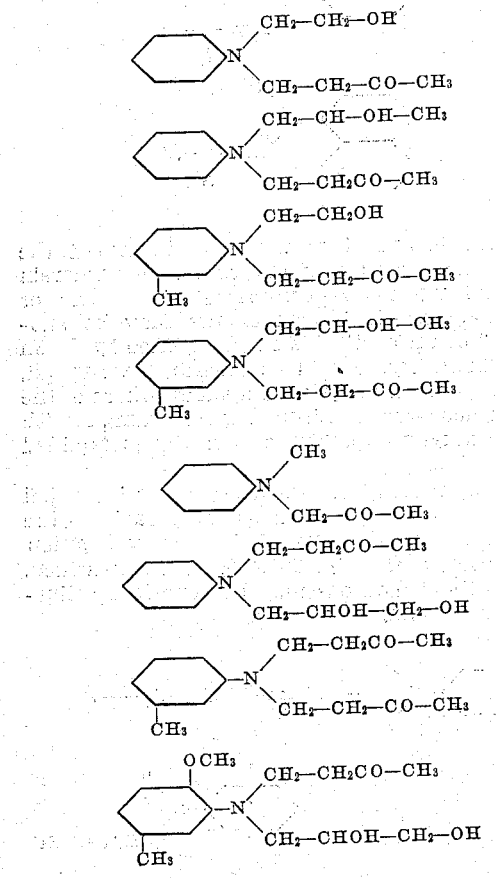

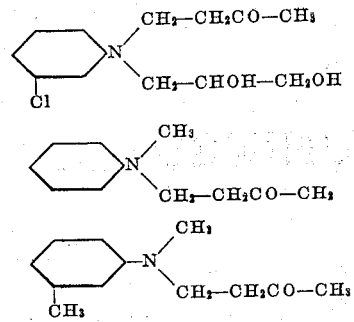

It will be observed that a number of the foregoing compounds contain a hydroxyalkyl group in the molecule and we have found, as will be described in further detail hereinafter, that compounds containing the above hydroxyalkyl group and a keto group in the molecule are ones in which we are interested in particular. Further details respecting our invention will be had from a consideration of the following specific examples. The first group of examples to be set forth will illustrate a species of compound which may be illustrated by the general formula:

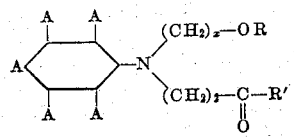

In this formula R represents a member from the group consisting of alkyl, hydroxyalkyl, alkoxyalkyl, and aryl, R' represents a member from the group consisting of alkyl, aryl, and tetrahydrofurfuryl and A is in many instances hydrogen or simple alkyl, but may also be halogen, alkoxyalkyl, amino, or derivatives thereof. As already indicated, when A is a hydroxy group in the ortho or para position, the compound has value for use in the photographic field. While we have shown the carbonyl group attached to a $(CH_2)_2$— group and this is a type of carbon linkage we employ in a number of the examples, as will be observed in another species of compounds to be illustrated, this carbon chain, in addition to being an alkylene chain, may be for example a hydroxyalkyl group. As pointed out above, our preferred compounds will contain a hydroxyalkyl group in the molecule in at least one of the substituents.

Specific compounds and their preparation are set forth in the following examples:

EXAMPLE 1.—γ-*Ketobutylglycerylaniline*

166 gm. glycerylaniline are stirred in water (200 cc.) with 70 gm. methyl vinyl ketone at 50° for 12 hours. The reaction product is extracted with benzene and fractionated under reduced pressure. There is obtained a good yield of γ-ketobutylglycerylaniline boiling at 184–189°/2.5 mm.

EXAMPLE 2.—γ-*Ketobutyl-β-hydroxyethyl-aniline*

151 gm. β-hydroxyethylaniline are stirred in 150 cc. water at 50° with 70 gm. methyl vinyl ketone for 15 hours. The reaction product is extracted with benzene and distilled under reduced pressure. There is obtained a good yield of the desired compound boiling at 166–170°/2 mm.

EXAMPLE 3.—γ-*Ketoamyl-β-methoxyethyl-m-anisidine*

153 gm. β-methoxyethyl-m-anisidine are reacted at 60° in 200 cc. water with 85 gm. ethyl vinyl ketone. The product is extracted with benzene and distilled under reduced pressure. There is obtained a good yield of the desired compound boiling at 190–195°/1 mm.

EXAMPLE 4.—γ-Keto-α-methylbutyl-β-hydroxypropylcresidine 200 gm. β-hydroxypropylcresidine are heated for 24 hours at 140–145° with 90 gm. iso-propenyl ketone and the reaction product distilled under reduced pressure. There is obtained a good yield of the desired compound boiling at 220–225°/1 mm.

EXAMPLE 5.—2-glyceryl-γ-ketobutyl-amino-4-acetaminoanisole 239 gm. 2-glycerylamino-4-actaminoanisole are reacted with 90 gm. methyl vinyl ketone for 12 hours. The product is recovered by evaporating the water and crystallizing from water.

EXAMPLE 6.—γ-Ketobutylglyceryl-o-anisidine 200 gm. glyceryl-o-anisidine are heated in an autoclave (200 cc. water) with 85 gm. methyl vinyl ketone at 150° for 6 hours. On distillation there is obtained a good yield of compound boiling at 195–200°/1.5 mm.

EXAMPLE 7.—γ-Ketobutyl-β-hydroxyethylaniline 140 gm. β-hydroxyethylaniline and 110 gm. γ-ketobutylbromide are heated in the presence of 100 gm. sodium bicarbonate until no more carbon dioxide is evolved. The product is extracted with benzene and distilled. There is obtained a good yield of the desired compound boiling at 160–164°/ 1.5 mm.

EXAMPLE 8.—γ-Ketobutyl-β-hydroxypropyl-m-aminobenzyl alcohol 180 gm. γ-ketobutyl-m-aminobenzyl alcohol are heated in an autoclave at 170° with 60 gm. trimethylene oxide for 8 hours. On distillation there is obtained a good yield of the desired compound.

Some of the intermediates that may be prepared using the methods described above are:
(1) α-Ethyl-γ-ketoamyl-β-hydroxy - β - ethoxyethyl-m-chloroaniline
(2) γ-Ketobutyltetrahydrofurfuryl-2,5 - dimethoxyaniline
(3) γ-Ketobutyl-β-hydroxyethyl-2-methoxy - 3 - methylaniline
(4) γ-Ketobutyl-γ-methoxy-β - hydroxypropyl-m-ethylbenzene
(5) 2-γ-ketobutyl-β-hydroxyethyl-4-acetaminoanisole While the foregoing compounds are satisfactory for producing dye intermediates and are useful for various other purposes, our preferred compounds distinguish therefrom in that not only do they contain a keto group but, also, the substituent containing the keto group also includes a hydroxy group. In other words, the linkage in our preferred compound may be exemplified by:

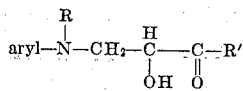

The aryl nucleus may be benzene, naphthalene, tetrahydroquinoline, benzomorpholine, and the like. R and R' have the values already assigned.

These compounds would be prepared by reacting the substituted arylamine with a compound containing the hydroxy carbonyl grouping discussed. This compound would have one or more reactive atoms to cause its attachment at the N-position. That is, the reaction producing our preferred compounds might be illustrated somewhat as folllows:

(C)
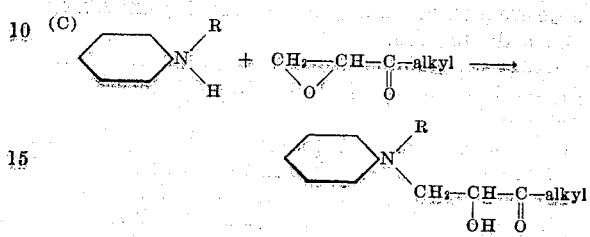

In addition to obtaining the reaction product indicated in the formulation, some of the secondary compounds of the formula:

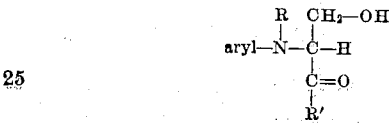

may be formed. However, our invention embraces both-type compounds and for convenience of consideration both are intended to be covered by our terminology when we refer to a group containing both hydroxy and keto substituents therein. Further details respecting these compounds and their method of preparation will be apparent from a consideration of the following examples:

EXAMPLE 9.—N-β-hydroxy-γ-ketobutyl-N-methylaniline

One mole of

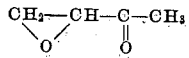

is heated in a closed reaction vessel with one mole of methyl aniline at 180° for six hours. When cool the viscous reaction product is removed. This material is pure enough for most uses, but can be purified by distillation under reduced pressure.

EXAMPLE 10.—N-β-hydroxy-γ-ketobutyl-N-β-hydroxyethyl-m-toluidine

One mole of β-hydroxyethyl-m-toluidine is heated in dioxane at 160–180° with one mole of γ-ketobutyl-α,β-butylene oxide. When cool the product is distilled under reduced pressure.

EXAMPLE 11.—Bis-N-β-hydroxy-γ-ketoamyl cresidine

One mole of cresidine is heated as in Example 9 with 2.1 moles γ-ketoamyl-α,β-amylene oxide at 180–200° for six to ten hours. The product is worked up as previously described.

EXAMPLE 12.—N-β-hydroxy-γ-ketobutyl-O-chloroaniline

One mole of O-chloroaniline is reacted as in Example 9, with one mole of γ-keto-α,β-butylene oxide. The reaction product is worked up as in Example 9.

EXAMPLE 13.—N-β-hydroxy-γ-ketobutyl-N-β-hydroxyethyl-2-ethoxy-5-acetamino aniline One mole of N-β-hydroxy-γ-ketobutyl-2-ethoxy-5-acetamino aniline is heated in dioxane with 1.1 moles ethylene oxide at 170–190° for ten hours. The product is worked up as previously described.

EXAMPLE 14.—*N-β-hydroxy-γ-ketobutyl-2,7-dimethyltetrahydroquinoline*

One mole of 2,7-dimethyltetrahydroquinoline is heated as in Example 9 with one mole of γ-keto-α,β-butylene oxide. The product is distilled if desired, any unchanged quinoline is removed by steam distillation.

Other compounds which were prepared by the methods illustrated by the foregoing specific examples, are as follows:

(1) N-β-hydroxy-γ-ketobutyl aniline
(2) N-β-hydroxy-γ-ketobutyl o-toluidine
(3) N-β-hydroxy-γ-ketobutyl o-anisidine
(4) N-β-hydroxy-γ-ketobutyl m-toluidine
(5) N-β-hydroxy-γ-ketobutyl-m-anisidine
(6) N-β-hydroxy-γ-ketobutyl m-chloroaniline
(7) N-β-hydroxyl-γ-ketobutyl cresidine
(8) N-β-hydroxy-γ-ketobutyl 2,5-dialkoxyaniline
(9) N-β-hydroxy-γ-ketobutyl 2-alkoxy-5-chloroaniline
(10) N-β-hydroxy-γ-ketobutyl α-naphthylamine
(11) N-β-hydroxy-γ-ketobutyl 1-amino - 5 - naphthol
(12) N-β-hydroxy-γ-ketobutyl 1-amino - 8 - naphthol
(13) N-β-hydroxy-γ-ketobutyl 2-methylbenzomorpholine
(14) N-β-hydroxy-γ-ketobutyl 2,5-dimethylbenzomorpholine
(15) N-β-hydroxy-γ-ketobutyl 2,7-dimethylbenzomorpholine
(16) N-β-hydroxy-γ-ketobutyl 2-methyltetrahydroquinoline
(17) N-β-hydroxy-γ-ketobutyl 2-methyl-7-acetaminotetrahydroquinoline
(18) N-β-hydroxy-γ-ketobutyl 2-methyl-7-acetaminobenzomorpholine
(19) N-β-hydroxy-γ-ketobutyl methyl-m-toluidine
(20) N-β-hydroxy-γ-ketobutyl ethyl-m-toluidine
(21) N-β-hydroxy-γ-ketobutyl N - β - hydroxyethylaniline
(22) N-β-hydroxy-γ-ketobutyl N-β-methoxyethylaniline
(23) N-β-hydroxy-γ-ketobutyl glycerol aniline
(24) N-β-hydroxy-γ-ketobutyl glycerol-m-toluidine
(25) N-β-hydroxy-γ-ketobutyl glycerol cresidine
(26) N-β-hydroxy-γ-ketobutyl butyl cresidine
(27) N-β-hydroxy-γ-ketobutyl butyl-m-toluidine
(28) N-β-hydroxy-γ-ketobutyl butyl aniline
(29) N-β-hydroxy-γ-ketobutyl carbityl aniline
(30) N-β-hydroxy-γ - ketobutyl tetrahydrofurfuryl aniline
(31) N-β-hydroxy-γ-ketobutyl diphenylamine
(32) N-β-hydroxy-γ-ketobutyl 1-amino - 5 - naphthol-6-sulphonic acid
(33) N-β-hydroxy-γ-ketobutyl

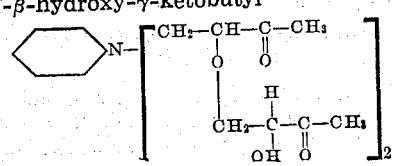

From the foregoing examples it can be seen that while our novel products may be prepared at relatively low temperatures under 100° C. in the presence of solvents such as water, hydrocarbons, and the like, various temperatures and solvents may be employed.

In general we would prefer to treat the reaction product by extraction with a solvent therefor, followed by distillation of the extract under reduced pressure to volatilize off the solvent and obtain the product which may be finally distilled over under reduced pressure. However, other procedures such as recrystallization and the like may also be applied to the treatment of our products.

As indicated above, certain of the hydroxy arylamines, in accordance with the present invention, are useful for photographic purposes. Such species of compound may be generically formulated as follows:

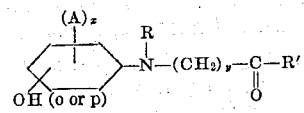

where A is a group selected from amino, hydroxyl, alkyl, alkoxy, and the like; R is hydrogen,

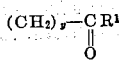

alkyl, aryl, or heterocyclic; R' is an alkyl group; and where $y$ is 1 or 2 and $x$ is zero, 1, or 2.

These compounds may be prepared by a variety of methods, some of which will be indicated below:

(D) 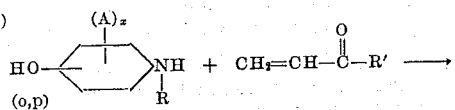

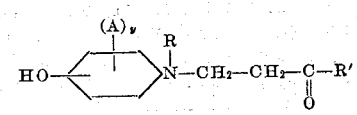

(E) 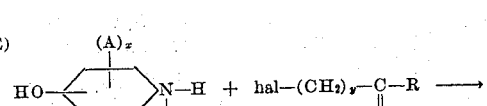

(F) 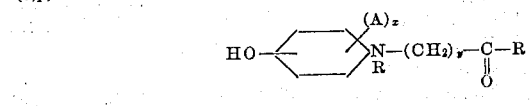

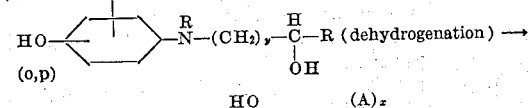

(G) 

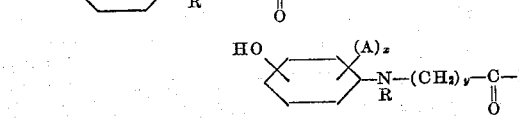

EXAMPLE 15

One mole of p-hydroxymethylaniline is warmed at the boiling point (or under pressure at higher temperature) with an excess of methylvinyl ketone. After 36 hours the reaction is stopped and any unchanged p-hydroxymethylaniline is separated by means of the Hinsberg reaction. The white crystalline compound thus prepared is treated in water with the calculated amount of sulfuric acid to give a white crystalline sulfate. The compound thus prepared has the formula:

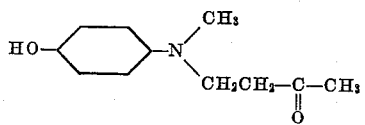

Similarly 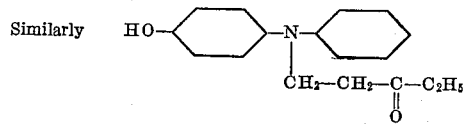

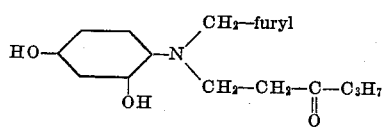

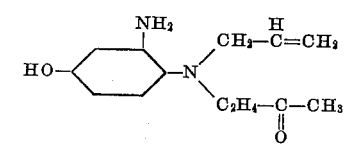

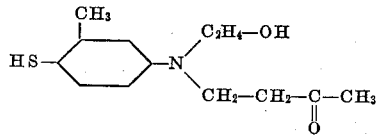

may be prepared.

EXAMPLE 16

One mole of o-aminophenol is heated in methanol or ethanol with 1.1 moles of β-chloroethylmethyl ketone and 1.1 moles of sodium carbonate. When no more carbon dioxide is evolved the salt is separated by filtration and o-hydroxy-γ-ketobutylaniline is recovered by evaporating the alcohol until crystallization occurs. The sulfate or hydrochloride may be prepared if desired. In place of β-chloroethylmethyl ketone we may use, for example, chloroacetone, α-chloromethylethyl ketone, α-chloromethylpalmityl ketone, β-chlorodiethyl ketone, β-chloroethylpropyl ketone, β-chloroethylbutyl ketone, and similar reagents.

In addition to the above compounds some of the aminophenols which we have found to be of value are listed:

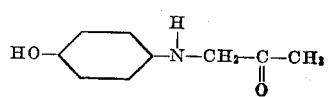

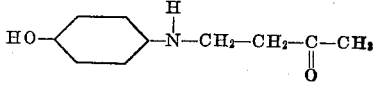

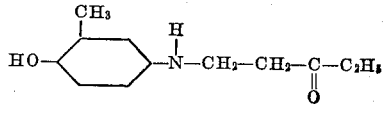

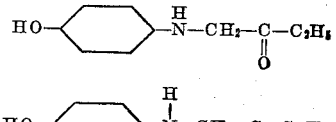

As indicated, the products in accordance with the present invention have many industrial uses, for example, our compounds may be used as dye intermediates in accordance with procedure outlined in our application aforesaid, or as set forth in our Patent No. 2,213,740 dated September 3, 1940. Or certain of the compounds herein described, as exemplified by those wherein the aryl nucleus is substituted in the ortho or para position with a hydroxy group, may be incorporated with various alkalies and other components used in photographic developers to obtain a photographic developer as referred to in our application Ser. No. 301,466.

It is apparent from the foregoing that our invention is susceptible of certain modifications, hence, we do not wish to be restricted excepting insofar as may be necessitated and the spirit of the appended claims.

What we claim and desire to be secured by Letters Patent of the United States is:

1. A compound of the following general formula:

$$R-N\begin{matrix}R_1\\R_2-CO-R_3\end{matrix}$$

wherein R represents an aryl group of the benzene series, $R_1$ represents a hydroxyalkyl group containing from 2 to 3 carbon atoms, $R_2$ represents an alkylene radical selected from the group consisting of ethylene and methylethylene and $R_3$ represents an alkyl group selected from the group consisting of methyl and ethyl.

2. A compound of the following formula:

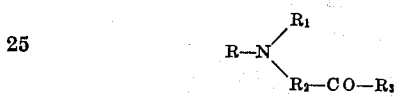

3. A compound of the following formula:

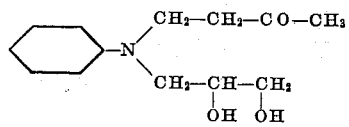

4. A process for preparing a derivative of an amine comprising heating an aliphatic unsaturated ketone selected from the group consisting of vinyl alkyl ketones and isopropenyl alkyl ketones, with a monocyclic secondary amine of the benzene series.

5. A process for preparing a derivative of an amine comprising heating a vinyl alkyl ketone with a monocyclic secondary amine of the benzene series.

6. A process for preparing a derivative of an amine comprising heating methyl vinyl ketone with a monocyclic secondary amine of the benzene series.

7. A process for preparing a derivative of an amine comprising heating an aliphatic unsaturated ketone selected from the group consisting of alkyl vinyl ketones and alkyl isopropenyl ketones, with a monocyclic hydroxy alkyl aryl amine of the benzene series.

JOSEPH B. DICKEY.
JAMES G. McNALLY.